United States Patent [19]

Satoh et al.

[11] Patent Number: 4,789,974
[45] Date of Patent: Dec. 6, 1988

[54] OPTICAL INFORMATION RECORDING/REPRODUCING APPARATUS

[75] Inventors: Isao Satoh, Neyagawa; Yuzuru Kuroki, Toyonaka; Makoto Ichinose, Sakai; Katsumi Murai, Kyoto, all of Japan

[73] Assignee: Matsushita Electric Industrial Co., Ltd., Osaka, Japan

[21] Appl. No.: 94,899

[22] Filed: Sep. 10, 1987

[30] Foreign Application Priority Data

Sep. 16, 1986 [JP] Japan ............................ 61-217425
Sep. 16, 1986 [JP] Japan ............................ 61-217426
Sep. 26, 1986 [JP] Japan ............................ 61-229005

[51] Int. Cl.⁴ .................... G11B 7/00; G11B 5/09; G01J 1/20
[52] U.S. Cl. ............................. 369/45; 369/44; 369/54; 250/201
[58] Field of Search ...................... 369/44, 45, 54, 58; 250/201 DF

[56] References Cited

U.S. PATENT DOCUMENTS

| | | | |
|---|---|---|---|
| 4,286,318 | 8/1981 | Immink et al. | 369/44 X |
| 4,363,961 | 12/1982 | Okada et al. | 369/45 X |
| 4,417,330 | 11/1983 | Hazel et al. | 369/45 X |
| 4,613,961 | 9/1986 | Aarts | 369/44 |

Primary Examiner—William L. Sikes
Assistant Examiner—Akm E. Ullah
Attorney, Agent, or Firm—Stevens, Davis, Miller & Mosher

[57] ABSTRACT

In an optical information recording/reproducing apparatus for recording/reproducing information on or from an optical disc, a laser beam is focused on the surface of a substrate of the optical disc so that the intensity or a high frequency component of a reflected laser beam is used to detect contaminants on the optical disc surface or a test signal containing a plurality frequency components and recorded on a specified track on the optical disc is reproduced and detected so that the difference between amplitudes of the frequency components is used to detect contaminants on the optical disc surface. Scattering of the laser beam can be prevented and recording/reproducing can be effected with a proper level of laser power.

10 Claims, 6 Drawing Sheets

OPTICAL INFORMATION RECORDING/REPRODUCING APPARATUS

BACKGROUND OF THE INVENTION

This invention relates to optical information recording/reproducing apparatus for recording and reproducing information on and from an optical disc and more particularly to an optical information recording/reproducing apparatus which can afford to detect contaminants on an optical disc.

Because of high convergency of laser beams and narrowness of the pitch between tracks, the optical information recording/reproducing apparatus adapted to record information on an optical disc can provide high recording density which is 10 or more times the recording density obtained with the magnetic disc apparatus.

Especially, a write-once type optical disc and a magneto-optical disc are noticeable for the fact that information can be recorded and reproduced with these discs in contrast to a video disc and a compact disc which are dedicated to reproduction. FIG. 11 schematically shows a prior art optical information recording/reproducing apparatus. Referring to FIG. 11, information is recorded on an optical disc 1 which is rotated by a motor 2. An optical head 3 converges laser beams on the optical disc 1 for the purpose of recording a signal thereon and detecting a change in reflection of a laser beam to read the recorded information. A laser drive head amplifier circuit 4 is comprised of a laser drive unit for driving a laser included in the optical head 3 and a head amplifier for detecting a focus error signal 100, a tracking error signal 101 and a reproduction signal 102. A focus control circuit 5 generates a focus drive signal 106 which drives an actuator of the optical head so that a laser beam can be focused on a guide track on the optical disc 1. A tracking control circuit 6 drives the actuator of the optical head with a tracking drive signal 107 so that the laser beam can follow the guide track on the optical disc 1. A data modem circuit 7 digitally modulates an input data signal 103 and demodulates the reproduction signal 102 to deliver an output data signal 105. A control microcomputer 8 (CPU) performs system control for the apparatus. The microcomputer 8 issues a focus command signal 108 to the focus control circuit 5, a tracking command signal 109 to the tracking control circuit 6 and a command signal 110 to the data modem circuit 7. In the prior art optical information recording/reproducing apparatus constructed as above, laser beams emitted from the optical head 3 are converged on a guide track on the optical disc 1 rotating at a constant speed and a laser beam is caused to follow the track. The focus error signal 100 and the tracking error signal 101 which are detected by the optical head 3 are respectively applied to the focus control circuit 5 and the tracking control circuit 6, whereby the actuator of the optical head 3 is driven for focus/tracking controlling to permit the optical head 3 to irradiate laser beams which are focused on a guide track.

For recording data, the input data signal 103 is modulated by the data modem circuit 7 and laser beams of the intensity suited for recording are modulated with a modulation data signal 104 so as to be irradiated on the optical disc 1.

For reproducing data, laser beams of a low level insufficient for recording are irradiated on the optical disc 1 and a resulting reproduction signal 102 is demodulated by the data modem circuit 7 to produce an output data signal 105. Typically, reproduction power has a level of about 1 mW and recording power has a level of 5 to 10 mW.

With the above construction, however, when the optical disc 1, which is typically rotated at a high speed of about 1800 rpm, is left to rotate for a long period of time during a continuous operation, dusts in the air are deposited onto the surface of the optical disc 1 because the optical disc 1 having a substrate made of an electrically insulating material such as resin or glass is electrified. The laser beams are partly absorbed and scattered by the deposited dusts and power of the laser beams is considerably attenuated by several of tens of percents. Consequently, when recording a signal on a recording layer of a photosensitive material which is vapor-deposited on a guide track, the requisite level of recording laser power, exemplarily 5 to 10 mW, becomes considerably deficient amounting to 3 to 6 mW, thus preventing excellent recording of the signal.

In other words, since recording is not effected with an optimum level of recording power and so record of pits are not saturated, there result problems that the recording pits are degraded under the influence of a change in environment to decrease their life and that the amplitude of the reproduction signal is decreased, thus aggravating the bit error rate.

SUMMARY OF THE INVENTION

In view of the above, it is an object of this invention to provide an optical information recording/reproducing apparatus capable of detecting contaminants on the optical disc which make laser power deficient and prevent excellent recording and reproducing.

According to an aspect of the invention, there is provided an optical information recording/reproducing apparatus comprising optical means for converging laser beams from a laser light source on an optical disc, first focus control means for focusing a laser beam on a guide track on the optical disc, second focus control means for focusing the laser beam on a surface of a substrate of the optical disc, and reflected beam intensity detection means for detecting intensity of reflection of the laser beam which is focused on the surface of the optical disc substrate.

According to another aspect of the invention, there is provided an optical information recording/reproducing apparatus comprising optical means for converging laser beams from a laser light source on an optical disc, first focus control means for focusing a laser beam on a guide track on the optical disc, second focus control means for focusing the laser beam on a surface of a substrate of the optical disc and high frequency component detection means for detecting a high frequency component in excess of a reference value from reflection of the laser beam which is focused on the surface of the optical disc substrate.

According to still another aspect of the invention, there is provided an optical information recording/reproducing apparatus comprising optical means for converging laser beams from a laser light source, focus control means for focusing a laser beam on a guide track on the optical disc, recording means for modulating and recording information, reproducing means for receiving reflection of a focused laser beam to reproduce a signal, and test signal detection means for detecting a test signal containing predetermined frequency components from the output signal delivered out of the reproducing means.

Thus, in accordance with the teachings of the present invention, contaminants on the surface of the optical disc can be detected and recording of a signal on the optical disc can be inhibited when contaminants exceeding, in amount, a reference level are detected.

DESCRIPTION OF THE PREFERRED EMBODIMENTS

A first embodiment of the invention will first be described.

Figure 1:
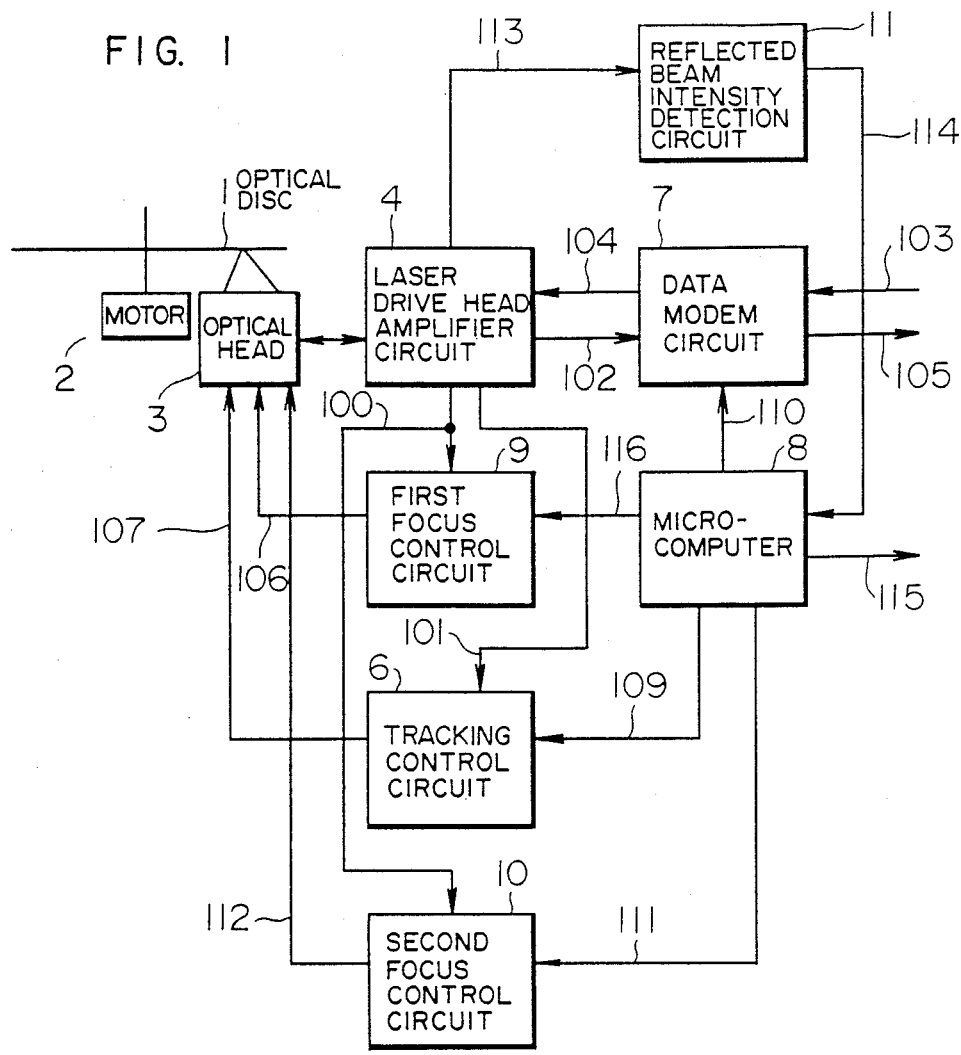
FIG. 1 is a schematic block diagram illustrating an optical information recording/reproducing apparatus according to a first embodiment of the invention.
Figure 11:
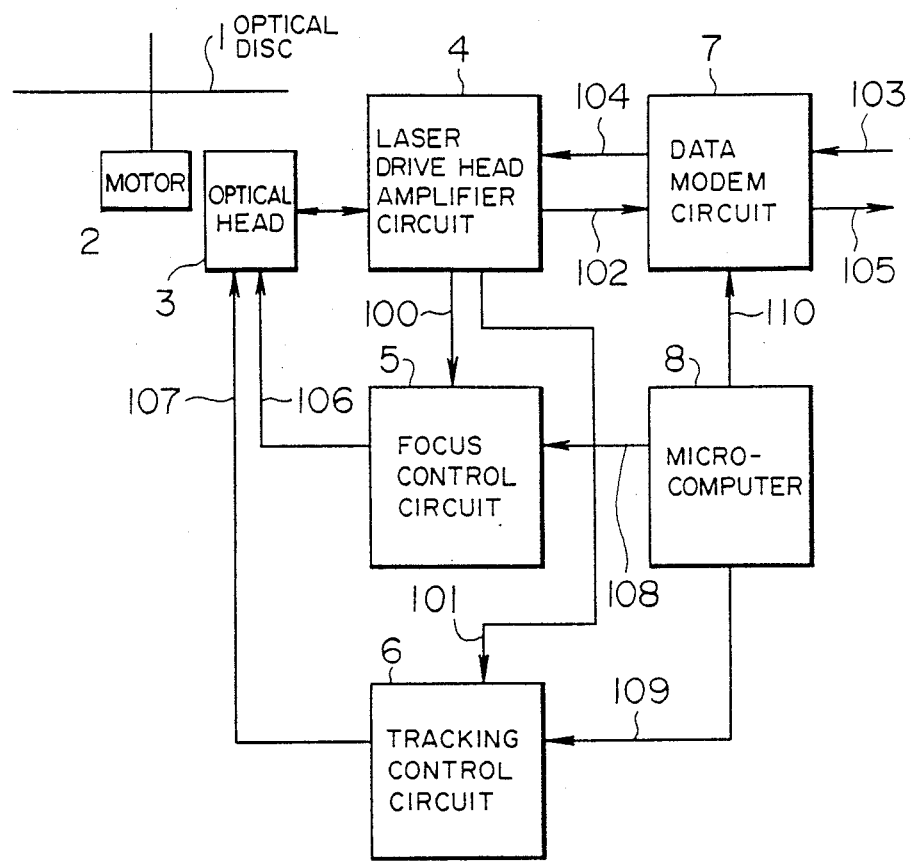
FIG. 11 is a schematic block diagram illustrating a prior art optical information recording/reproducing apparatus.

An optical information recording/reproducing apparatus according to the first embodiment of the invention is schematically illustrated in FIG. 1 in which components 1 to 4 and 6 to 8 and signals 100 to 107 and 109 to 110 are identical to the corresponding components and signals in FIG. 11. A first focus control circuit 9 focuses a laser beam converged by the optical head 3 on a recording layer of a guide track on the optical disc 1, a second focus control circuit 10 focuses the laser beam on a surface of the substrate of the optical disc 1, and a reflected beam intensity detection circuit 11 detects intensity of reflection of the laser beam which is focused on the surface of the substrate of the optical disc 1.

The optical information recording/reproducing apparatus of this embodiment constructed as above operates as will be described below.

When the optical disc 1 is mounted on the motor 2, the microcomputer 8 sends a command signal 111 to the second focus control circuit 10 and a focus drive signal 112 delivered out of the control circuit 10 causes the laser beam to be focused on the surface of the optical disc substrate. A laser beam irradiated on the substrate surface of the optical disc 1 is reflected at that surface and returned to the optical head 3. A signal representative of a reflected laser beam is amplified by the laser drive head amplifier circuit 4 and applied, as a reflection signal 113, to the reflected beam intensity detection circuit 11. Magnitude of the reflection signal 113 is compared with a reference voltage at the reflected beam intensity detection circuit 11.

When the surface of the substrate of the optical disc 1 is contaminated, the laser beam irradiated on the substrate surface is partly adsorbed and scattered by contaminants and the quantity of reflected beam is decreased to render a contaminant detection signal 114 enabled. The thus enabled contaminant detection signal 114 is read by the microcomputer 8. When detecting an enabled state, the microcomputer 8 inhibits recording of the modulation data signal 104 on the optical disc and informs the host of an error signal 115 to this effect.

Contrarily, when a contaminant detection signal 114 is rendered disabled, the microcomputer 8 turns off the command signal 111 to the second focus control circuit 10 in order to execut recording of subsequent data and thereafter issues a command signal 116 which activates the first focus control circuit 9. This control circuit 9 focuses the laser beam on a recording layer of a guide track on the optical disc 1 to ensure that data can be recorded on or reproduced from the optical disc 1. The data recording/reproducing is carried out in the manner as detailed in connection with FIG. 11 and will not be described herein.

Figure 2:
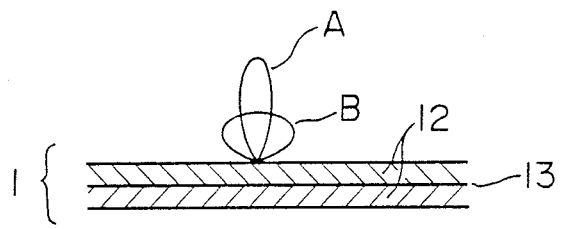
FIG. 2 illustrates intensity distributions of reflected beams from the surface of an optical disc substrate used in the first embodiment.

Intensity distributions of reflected beams in accordance with the presence or absence of contaminants on the surface of the substrate of the optical disc 1 are illustrated in FIG. 2 in which the substrate and the recording layer included in the optical disc 1 are designated by 12 and 13, respectively. In FIG. 2, an intensity distribution A is for the absence of contaminants on the substrate of the optical disc 1 and an intensity distribution B is for the presence of contaminants on the substrate. The distribution B indicates that the reflected beam is decreased in peak value and the deflection direction is broadened. Since the laser beam is focused on the substrate surface which is liable to be contaminated, the intensity of the reflected beam greatly differs in accordance with the presence or absence of contaminants and the reflected beam intensity in the case of the presence of contaminants can accurately be discriminated from the reflected beam intensity in the case of the absence of contaminants. When the laser beam is focused on a guide track by operating the first focus control circuit 9, this laser beam is out of focus and has a somewhat large spot area on the substrate surface and a resulting reflection amount of beam reflected from the substrate surface less differs in quantity in accordance with the presence or absence of contaminants on the substrate surface, having less margin of discrimination and less reliability.

As described above, the present embodiment comprises the second focus control circuit 10 for focusing the laser beam on the surface of the optical disc substrate and the reflected beam intensity detection circuit 11 for detecting intensity of the reflected beam from the substrate surface, whereby when the optical disc having a so-called dielectric substrate made of an electrically insulating material, for example, either resin such as polycarbonate and PMMA or glass rotates at a high speed so as to be electrified owing to friction between air and the substrate surface and the thus created electric charge attracts dusts floating in the air to form contaminants on the substrate surface, the contaminants can be detected to prevent the occurrence of trouble due to a deficient level of recording laser power.

In consideration of the fact that the substrate is electrified by friction between air and the substrate and dusts are deposited in greater amounts on an outer circumferential portion of the disc, which rotates at a higher peripheral speed, than on the other portion, the detection of the quantity of reflected beam from the substrate surface may preferably be effected at the outer circumferential portion of the disc.

A second embodiment of the invention will now be described.

While in the first embodiment the magnitude of the reflection signal is monitored to detect contaminants on the substrate surface, a high frequency component of the reflection signal is monitored and an increase in the high frequency component representative of the presence of contaminants is detected in the present embodiment.

Figure 3:
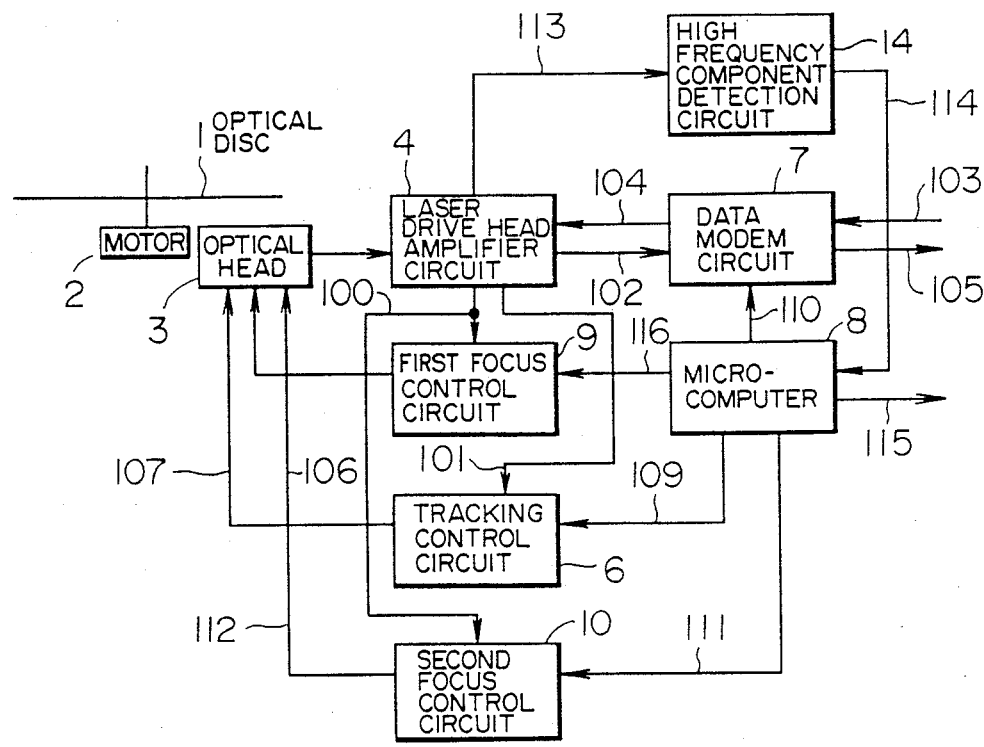
FIG. 3 is a schematic block diagram illustrating an optical information recording/reproducing apparatus according to a second embodiment of the invention.

An optical information recording/reproducing apparatus according to the second embodiment is schematically illustrated in FIG. 3. In FIG. 3, components 1 to 4 and 6 to 10 and signals 100 to 107 and 109 to 116 are identical to the corresponding components and signals in FIG. 1, and reference numeral 14 designates a high frequency component detection circuit which detects a high frequency component of reflection of the laser beam which is focused on the surface of the substrate of the optical disc 1.

The optical information recording/reproducing apparatus of this embodiment constructed as above operates as will be described below.

When the optical disc 1 is mounted on the motor 2, the microcomputer 8 sends a command signal 111 to the second focus control circuit 10 and a focus drive signal 112 from the control circuit 10 causes the laser beam by the optical head 3 to be focused on the surface of the substrate of the optical disc 1. A laser beam irradiated on the substrate surface of the optical disc 1 is reflected at that surface and returned to the optical head 3. A signal representative of a reflected laser beam is amplified by the laser drive head amplifier circuit 4 and applied, as a reflection signal 113, to the high frequency component detection circuit 14 in which a high frequency component of the reflection signal 113 is extracted and amplitude of the extracted high frequency component is compared with a reference voltage. When the surface of the optical disc substrate is contaminated with, for example, fine dusts, the reflected beam of the laser beam which is irradiated on the substrate surface contains a high frequency component. With the high frequency component being in excess of the reference value, a contaminant detection signal 114 is rendered enabled and read by the microcomputer 8. When detecting an enabled state, the microcomputer 8 inhibits recording of the modulation data signal 104 on the optical disc and informs the host of an error signal 115 to this effect.

Contrarily, when a contaminant detection signal 114 is rendered disabled, the microcomputer 8 turns off the command signal 111 to the second focus control circuit 10 in order to execute recording of subsequent data and thereafter issues a command signal 116 which activates the first focus control circuit 9. This control circuit 9 focuses the laser beam on a recording layer of a guide track on the optical disc 1 to ensure that data can be recorded on or reproduced from the optical disc 1. The data recording/reproducing is carried out in the manner as detailed in connection with FIG. 11 and will not be described herein.

Figure 4:
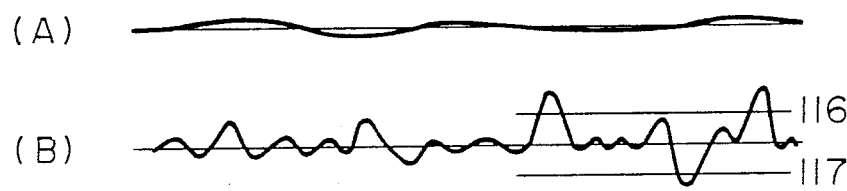
FIG. 4 illustrates at sections (A) and (B) waveforms of reflected beams from the surface of an optical disc substrate used in the second embodiment.

When the laser beam is focused on the substrate surface of the optical disc 1 by means of the second focus control circuit, the reflection signal takes a waveform as shown at section (A) in FIG. 4 in the case of the absence of contaminants on the substrate surface of the optical disc 1 and a waveform as shown at section (B) in FIG. 4 in the case of the presence of contaminants on the substrate surface. In the waveform at (A), substantially no high frequency component exists but in the waveform at (B), an increased high frequency component exists which results from scattering of the reflected beam by contaminants such as fine dusts on the substrate surface. Since the laser beam is focused on the contaminated substrate surface, the amplitude of the waveform at (B) is as sufficiently large as several times the amplitude of the waveform at (A) and the former can accurately be discriminated from the latter. When the laser beam is focused on a guide track by operating the first focus control circuit 9, this laser beam is out of focus on the substrate surface and reflection of a resulting large laser beam spot at the substrate surface less differs in quantity in accordance with contaminants on the substrate surface, having less margin of discrimination and less reliability.

Figure 5:
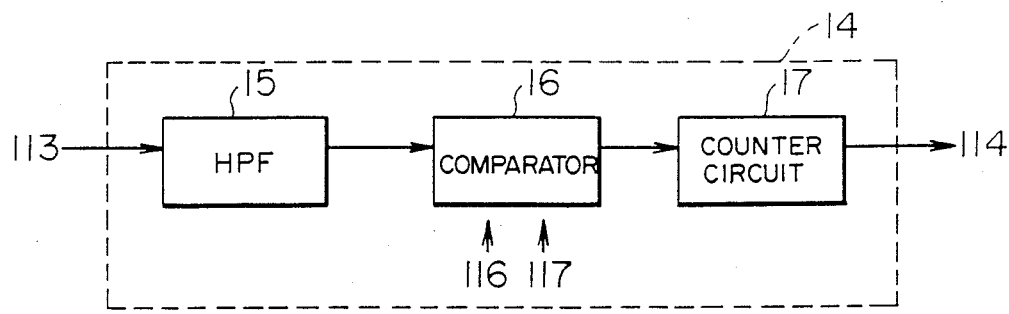
FIG. 5 is a schematic block diagram illustrating a high frequency component detection circuit.

Exemplarily, the high frequency component detection circuit 14 of FIG. 3 may be constructed as shown in FIG. 5. Only a high frequency component is extracted by a high-pass filter 15 from a reflection signal 113 representative of a reflected beam of the laser beam which is focused on the surface of the substrate of the optical disc 1 and its amplitude is compared at a comparator 16 with positive and negative reference voltages 116 and 117. An output signal of the comparator 16 is counted by a counter circuit 17. Thus, when the number of peaks of the high frequency component in excess of the positive and negative reference voltages exceeds a predetermined value, the contaminant detection signal 114 is rendered enabled. The counter circuit may be replaced with a timer circuit. In this case, the detection of contaminants is decided by totalling intervals of time during which the reference voltages are exceeded.

As described above, the second embodiment comprises the focus control circuit 10 for focusing the laser beam on the surface of the optical disc substrate and the high frequency component detection circuit 14 for detecting a high frequency component of a reflected beam from the substrate surface, whereby contaminants deposited on the optical disc can be detected to prevent the occurrence of trouble due to a deficient level of recording laser power.

Considering that the substrate is electrified by friction between air and the substrate and dusts are deposited in greater amounts on an outer circumferential portion of the disc, which rotates at a higher peripheral speed, than on the other portion, the detection of the quantity of reflected beam from the substrate surface may preferably be effected at the outer circumferential portion of the disc.

A third embodiment of the invention will now be described.

Figure 6:
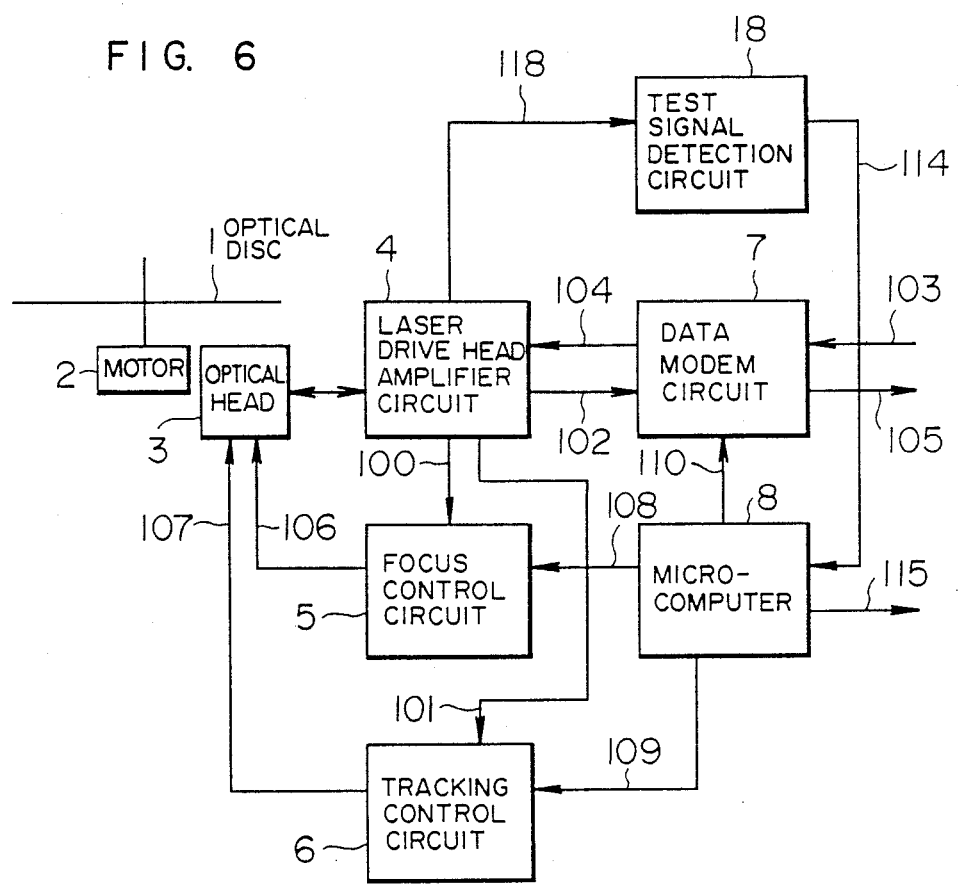
FIG. 6 is a schematic block diagram illustrating an optical information recording/reproducing apparatus according to a third embodiment of the invention.

An optical information recording/reproducing apparatus according to this embodiment is schematically illustrated in FIG. 6 in which component 1 to 8 and signals 100 to 110 are identical to the corresponding components and signals in FIG. 11 and reference numeral 18 designates a test signal detection circuit which detects a difference between reproduced amplitudes of frequency components of a test signal which is recorded on a specified track on the optical disc.

The optical information recording/reproducing apparatus according to this embodiment constructed as above operates as will be described below.

When the optical disc 1 is mounted on the motor 2, the microcomputer 8 sends a command signal 108 to the focus control circuit 5 and a focus drive signal 106 from the control circuit 106 causes the converged laser beam by the optical head 3 to be focused on a recording layer of a guide track on the optical disc 1. Thereafter, the tracking control circuit 6 is activated by a tracking command signal 109 and an address is read out in reproducing signal 3, so that a linear motor (not shown) is moved in accordance with the address to seek a test track on which a test signal is recorded. A test signal reproduction signal 118 obtained from the test track is applied to the test signal detection circuit 18 in which the test signal reproduction signal 118 is decomposed into two frequency components and a difference between amplitudes of the frequency components is compared with a reference voltage. In order that the amplitude of the test signal is not varied under the influences of contaminants on the substrate surface and characteristic variations in manufactured elements of the apparatus, the test signal contains at least two different frequency components.

When the substrate surface of the optical disc 1 is contaminated, the converged laser beam which is irradiated on the substrate surface is diffused by contaminants and a beam spot of the focused laser beam exceeds a diffraction limit of the focusing lens. Consequently, the reproduced amplitude of the test signal has such frequency characteristics that the difference between amplitudes of the two frequency components exceeds the reference value in the presence of contaminants, and the contaminant detection signal 114 is rendered enabled. When detecting contaminants by reading the contaminant detection signal 114, the microcomputer 8 inhibits recording of the modulation data signal 104 on the optical disc and informs the host of an error signal 115 to this effect.

Contrarily, when a contaminant detection signal 114 is rendered disabled, the microcomputer 8 executes recording of subsequent data. The data recording/reproducing is carried out in the manner as detailed in connection with FIG. 11 and will not be described herein.

Figure 7:
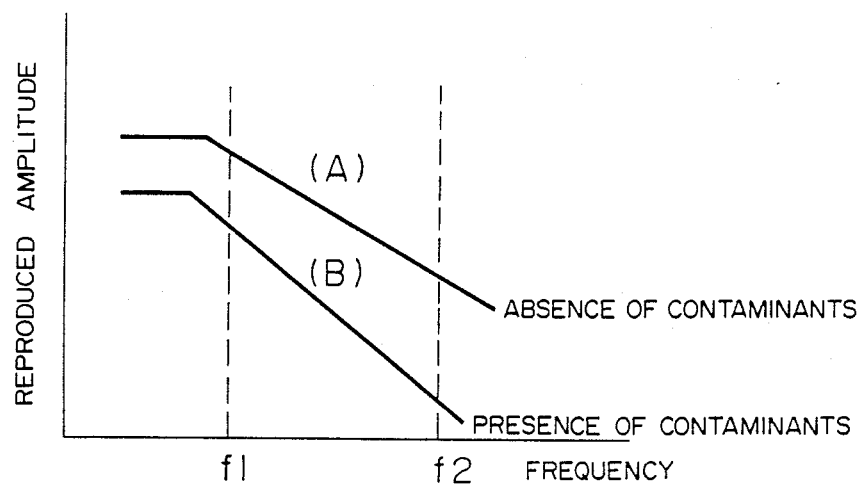
FIG. 7 is a graph showing frequency characteristics of the reproduction signal in accordance with the presence and absence of contaminants on the surface of an optical disc substrate used in the third embodiment.

The reproduction signal 118 has a frequency characteristic as indicated by a curve A in FIG. 7 in the case of the absence of contaminants on the substrate surface of the optical disc and a frequency characteristic as indicated by a curve B in FIG. 7 in the case of the presence of contaminants.

The contaminants on the surface of the substrate of the optical disc 1 is of a mixture of oil film-like contaminants such as nicotine or tar and fingerprints and dust-like contaminants such as flue and dirts. This kind of contaminants disturbs spatial coherency of the converged laser beam to degrade focusing thereof. It follows therefore that in the presence of contaminants, the frequency characteristic of the reproduction signal is more degraded at the higher frequency than at the lower frequency, as indicated by the curve B in FIG. 7.

Figure 8:
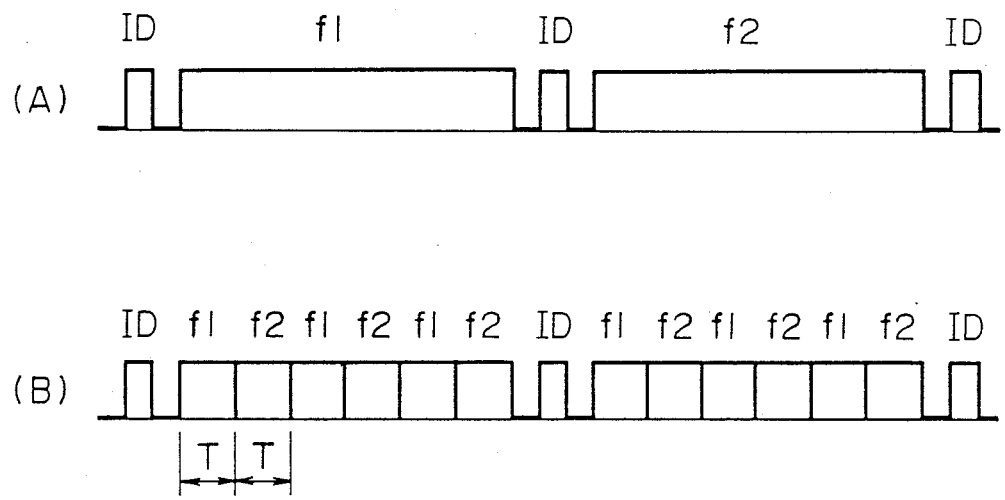
FIG. 8 illustrates at sections (A) and (B) waveforms of test signals.

FIG. 8 illustrates at sections (A and (B) exemplary waveforms of the test signal. A test signal waveform shown at (A) contains frqeuency components $f_1$ and $f_2$ which are recorded in unit of sector, and a test signal waveform shown at (B) contains burst-like frequency components $f_1$ and $f_2$ which are recorded repetitiously at a period of T within individual sectors. The test signal is either recorded precedently in the form of raised/recessed pits or recorded by means of the optical information recording/reproducing apparatus.

With the test signal shown at (A) in FIG. 8, envelope signals for sectors corresponding to the frequency components $f_1$ and $f_2$ are detected, amplitudes of the envelope signals are measured and a difference between these amplitudes is compared with the reference value, thus detecting contaminants on the substrate.

Figure 9:
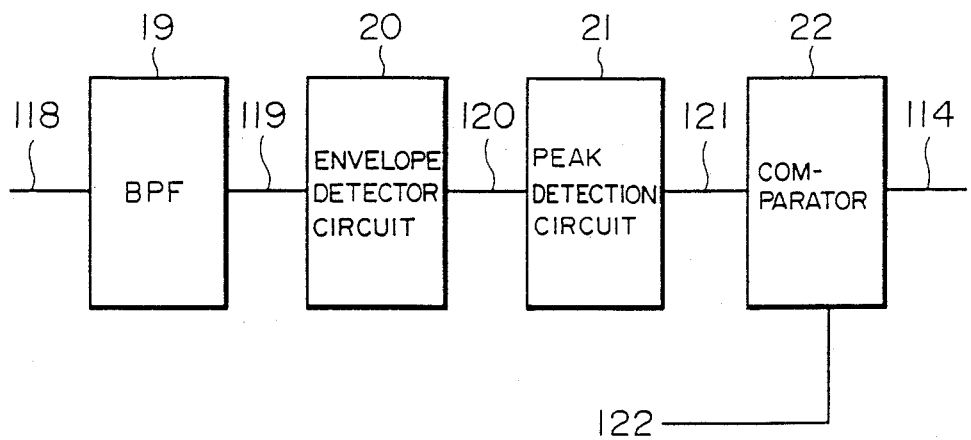
FIG. 9 is a block diagram of a test signal detection circuit.

The test signal detection circuit 18, which is adapted for the test signal waveform shown at (B) in FIG. 8, is schematically illustrated in a block diagram of FIG. 9.

Figure 10:
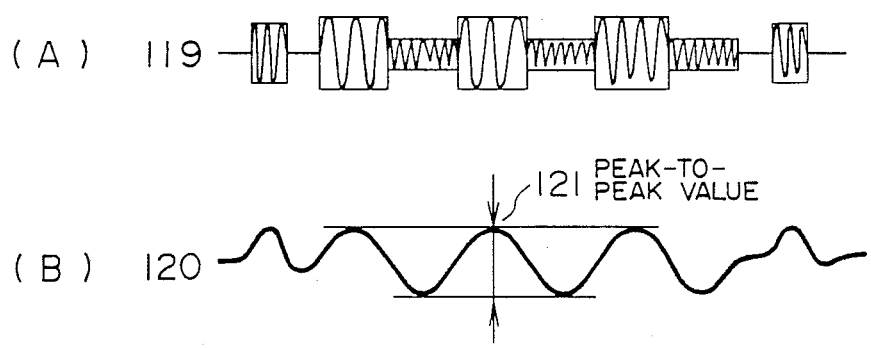
FIG. 10 illustrates at section (A) and (B) signal waveforms appearing at points in the circuit of FIG. 9.

FIG. 10 illustrates signal waveform appearing at points in the FIG. 9 test signal detection circuit 18, especially indicating at section (A) a filter output signal 119 and at section (B) a detector output signal 120.

A band-pass filter 19 extracts two frequency components from the test signal reproduction signal 118 obtained from the test track. Envelopes of the filter output signal 119 from the band-pass filter 19 are detected by an envelope detector circuit 20. A detected output signal 120 from the envelope detector circuit is a sinusoidal signal having a period which is a reciprocal of repetition time 2T of the frequency components $f_1$ and $f_2$. Peak-to-peak values 121 of this sinusoidal signal are detected by a peak detection circuit 21 and the peak-to-peak values are compared with a reference value 122 at a comparator 22. When a peak-to-peak value exceeds the reference value 122, the contaminant detection signal 114 is rendered enabled. Since the frequency components $f_1$ and $f_2$ are differentially reproduced by the same optical head, the detection of contaminants is not affected by possible irregularity or variation in characteristics among manufactured apparatus elements or parts.

By choosing the minimum frequency of data modulation recording signal almost unaffected by contaminants as the frequency component $f_1$ of the test signal and the maximum frequency of data modulation recording signal sensitive to contaminants as the frequency components $f_2$, a single data signal reproducing system can be used in common for the reproduction of signal data and the detection of contaminants and besides contaminants on the substrate of the optical disc can be detected with high sensitivity.

Thus, in this embodiment, contaminants deposited on the optical disc can be detected by reproducing a plurality of frequency components of the test signal and detecting the difference between amplitudes of the frequency components.

As described above, according to the invention, since contaminants deposited on the surface of the substrate of the optical disc can be detected, a failure, caused by scattering of the laser beam, to record/reproduce information with a proper level of laser power can be prevented and significantly practical effects can be attained.

We claim:

1. An optical information recording/reproducing apparatus comprising:

optical means for converging laser beams from a laser light source on an optical disc formed with guide tracks;

first focus control means for focusing a laser beam on a guide track on said optical disc;

second focus control means for focusing the laser beam on a surface of a substrate of said optical disc; and reflected beam intensity detection means for detecting intensity of reflection of the laser beam which is focused on the surface of said optical disc substrate, said reflected beam detection means producing an output signal having a level which is representative of detection of contaminants on the surface of said optical disc.

2. An optical information recording/reproducing apparatus according to claim 1, wherein said second focus control means is activated each time said optical disc is exchanged.

3. An optical information recording/reproducing apparatus according to claim 1, wherein said second focus control means is activated in interlocked relationship with the outermost circumferential portion of said optical disc.

4. An optical information recording/reproducing apparatus according to claim 1, wherein said reflected beam intensity detection means inhibits recording on said optical disc by the output signal level lower than reference signal level.

5. An optical information recording/reproducing apparatus comprising:

optical means for converging laser beams from a laser light source on an optical disc formed with guide tracks;

first focus control means for focusing a laser beam on a guide track on said optical disc;

second focus control means for focusing the laser beam on a surface of a substrate of said optical disc; and high frequency component detection means for detecting a high frequency component in excess of a reference value from reflection of the laser beam which is focused on the surface of said optical disc substrate, said high frequency component detection means producing an output signal having a level which is representative of detection of contaminants on the surface of said optical disc.

6. An optical information recording/reproducing apparatus according to claim 5, wherein said second focus control means is activated each time said optical disc is exchanged.

7. An optical information recording/reproducing apparatus according to claim 5, wherein said second focus control means is activated in interlocked relationship with the outermost circumferential portion of said optical disc.

8. An optical information recording/reproducing apparatus according to claim 5, wherein said high frequency component detection means inhibits recording on said optical disc when it detects a high frequency component in excess of a predetermined reference value.

9. An optical information recording/reproducing apparatus for recording/reproducing information on or from an optical disc formed with guide tracks, comprising:

optical means for converging laser beams from a laser light source on said optical disc;

focus control means for focusing a laser beam on a guide track on said optical disc;

recording means for modulating and recording information;

reproducing means for receiving reflection of a focused laser beam to produce a signal; and test signal detection means for detecting a test signal containing predetermined frequency components from the output signal delivered out of said reproducing means, said test signal being recorded on a specified track and containing at least two frequency components, said test signal detection means detecting a difference between amplitudes of said two frequency components to detect contaminants on the surface of said optical disc in accordance with the difference.

10. An optical information recording/reproducing apparatus according to claim 9 wherein said two frequency components correspond to the maximum and minimum frequencies of the recording signal for said recording means, respectively.

* * * * *